(12) United States Patent
Hou et al.

(10) Patent No.: US 11,725,962 B2
(45) Date of Patent: Aug. 15, 2023

(54) SYSTEMS AND METHODS FOR GENERATING, UPDATING AND ENHANCING LARGE-SCALE HIGH-PRECISION 3D ROAD MAPS AND MULTI-LEVEL ROAD GRAPHS

(71) Applicant: BEIJING DIDI INFINITY TECHNOLOGY AND DEVELOPMENT CO., LTD., Beijing (CN)

(72) Inventors: Tingbo Hou, Santa Clara, CA (US); Yanke Wang, Beijing (CN)

(73) Assignee: Beijing Didi Infinity Technology and Development Co., Ltd., Beijing (CN)

( * ) Notice: Subject to any disclaimer, the term of this patent is extended or adjusted under 35 U.S.C. 154(b) by 196 days.

(21) Appl. No.: 17/423,758

(22) PCT Filed: Jan. 19, 2019

(86) PCT No.: PCT/CN2019/072440
§ 371 (c)(1),
(2) Date: Jul. 16, 2021

(87) PCT Pub. No.: WO2020/147134
PCT Pub. Date: Jul. 23, 2020

(65) Prior Publication Data
US 2022/0113159 A1    Apr. 14, 2022

(51) Int. Cl.
*G01C 21/00* (2006.01)
*G01C 21/34* (2006.01)

(52) U.S. Cl.
CPC ....... *G01C 21/387* (2020.08); *G01C 21/3461* (2013.01); *G01C 21/3837* (2020.08)

(58) Field of Classification Search
CPC .............. G01C 21/387; G01C 21/3837; G01C 21/3461
See application file for complete search history.

(56) References Cited

U.S. PATENT DOCUMENTS

2012/0316784 A1    12/2012   Chrysanthakopoulos

FOREIGN PATENT DOCUMENTS

| CN | 106599108 A | 4/2017 |
|---|---|---|
| CN | 107316328 A | 11/2017 |

(Continued)

OTHER PUBLICATIONS

PCT International Search Report and the Written Opinion dated Oct. 9, 2019, issued in related International Application No. PCT/CN2019/072440 (7 pages).

*Primary Examiner* — Vivek D Koppikar
*Assistant Examiner* — Jeffrey R Chalhoub
(74) *Attorney, Agent, or Firm* — Sheppard Mullin Richter & Hampton LLP

(57) ABSTRACT

Systems and methods involving obtaining point cloud data from one or more sources corresponding to one or more zones within a real-world space, the point cloud data representing surface features of structures detected within the one or more zones; defining a plurality of first-level nodes based on the point cloud data, individual first-level nodes corresponding to obtained point cloud data corresponding to individual zones of the one or more zones; identifying connections between two or more first-level nodes, the connections between the two or more first-level nodes based on connections between the point cloud data for the zones corresponding to the two or more first-level nodes; and defining a plurality of second-level nodes, individual second-level nodes corresponding to aggregated subsets of first-level nodes for which connections are identified.

16 Claims, 11 Drawing Sheets

(56) References Cited

FOREIGN PATENT DOCUMENTS

| CN | 108268514 A | 7/2018 |
|---|---|---|
| CN | 108827249 A | 11/2018 |

# SYSTEMS AND METHODS FOR GENERATING, UPDATING AND ENHANCING LARGE-SCALE HIGH-PRECISION 3D ROAD MAPS AND MULTI-LEVEL ROAD GRAPHS

CROSS REFERENCE TO RELATED APPLICATION

The present application is a national stage application under 35 U.S.C. § 371 of PCT Application No. PCT/CN2019/072440, filed Jan. 19, 2019, entitled "SYSTEMS AND METHODS FOR GENERATING, UPDATING AND ENHANCING LARGE-SCALE HIGH-PRECISION 3D ROAD MAPS AND MULTI-LEVEL ROAD GRAPHS", the disclosure thereof incorporated by reference herein in its entirety.

TECHNICAL FIELD

The present disclosure generally relates to building maps and road graphs, and more particularly some embodiments of the present disclosure relate to generating, updating, and enhancing high scale 3D road maps and multi-level road graphs.

BACKGROUND

Comprehensive situational awareness is critical to the effective operation of navigable technologies, among other things, intelligent vehicles, routing and modeling applications, emergency response and planning technology, and the like. With respect to autonomous vehicles, for example, comprehensive situational awareness is key to their navigational capabilities, intelligent responsiveness to surroundings, and other higher-level functionality. Road maps and road network graphs provide information that can be used in a variety of ways, for example to enable users to navigate from one geographic point to another in an intelligent manner (e.g., by identifying a route that provides the shortest path on the roadways between Point A and Point B, etc.). Conventional 3D road maps are made up of 3D point clouds that detail road topography, but current systems are limited in their ability to provide fine resolution of the environments they map on a large scale. That is, operational, computational, and management restrictions dictate that conventional maps are either large-scale and low-resolution, or high-resolution on a small-scale. To date, conventional mapping technologies lack the ability to generate, manage, and update large-scale maps (e.g., large enough to encompass an entire city or more) with high-resolution and accuracy (e.g. on a centimeter scale or better). The present disclosure provides technologies to overcome these weaknesses in the prior art, and enable a system and method for generating large-scale maps in high resolution, and road graphs representing the same.

BRIEF SUMMARY OF THE EMBODIMENTS

The present disclosure includes systems and methods for generating large-scale maps in high resolution, and road graphs representing the same. In accordance with one or more embodiments, an example system of the present disclosure may include: one or more processors; and a memory storing instructions that, when executed by the one or more processors, cause the system to: obtain point cloud data from one or more sources corresponding to one or more zones within a real-world space, the point cloud data representing surface features of structures detected within the one or more zones; define a plurality of first-level nodes based on the point cloud data, individual first-level nodes corresponding to obtained point cloud data corresponding to individual zones of the one or more zones; identify connections between two or more first-level nodes, the connections between the two or more first-level nodes based on connections between the point cloud data for the zones corresponding to the two or more first-level nodes; and/or define a plurality of second-level nodes, individual second-level nodes corresponding to aggregated subsets of first-level nodes for which connections are identified.

In accordance with some embodiments, systems of the present disclosure may be configured to: identify one or more pose parameters of a first-level node based on the pose parameters of the point cloud data associated with the zone corresponding to the node; identify a location parameter of a first-level node based on one or more of GPS or IMU data associated with the point cloud data associated with the zone corresponding to the node; and/or align the point cloud data of the first-level node with a map, the alignment based on one or more of the identified pose parameters and the location parameters.

In accordance with some embodiments, the memory may further store instructions that, when executed by the one or more processors, cause the system to: identify two or more first-level nodes corresponding to zones that are at least partially overlapping; align the two or more first-level nodes together in accordance with a constraint. In still further embodiments, the memory may further store instructions that, when executed by the one or more processors, cause the system to: compute an accuracy score for the alignment of the point cloud data of the first-level node with a map; and/or lock one or more of a location parameter and pose parameter of the first-level node if the accuracy score for the alignment of the first level node meets a predefined high-quality threshold.

Similarly, in some embodiments, the memory may further store instructions that, when executed by the one or more processors, cause the system to: compute an accuracy score for the alignment between the two or more first-level nodes, the accuracy score computed based on a predetermined criteria for measuring the quality of a fit between point clouds; and/or lock one or more of a location parameter and pose parameter of a first-level node of the two or more first-level nodes if the accuracy score for the alignment of the first level node meets a predefined high-quality threshold.

In some embodiments the aforementioned connection between the point cloud data for the zones corresponding to the two or more first-level nodes comprises matching features in an area of overlap between the zones.

In accordance with some embodiments, the memory may further store instructions that, when executed by the one or more processors, cause the system to: adjust one or more of a pose or a location of a second-level node based on the connections between the subset of first-level nodes that comprise the second-level node; and/or adjust one or more of a pose or a location of each first-level node in two subsets of first-level nodes based on a connection between the two second-level nodes corresponding to the two subsets of first-level nodes.

In still further embodiments, the memory may further store instructions that, when executed by the one or more processors, cause the system to: determine if newly obtained point cloud data denotes a change in the structures within a zone as represented by earlier obtained point cloud data; and/or update the map with the new point cloud data if the newly obtained point cloud data denotes a change that exceeds a predefined threshold for measuring change.

The present disclosure also extends to methods for providing the features disclosed herein. According the some embodiments, the present disclosure provides a method, comprising: obtaining point cloud data from one or more sources corresponding to one or more zones within a real-world space, the point cloud data representing surface features of structures detected within the one or more zones, defining a plurality of first-level nodes based on the point cloud data, individual first-level nodes corresponding to obtained point cloud data corresponding to individual zones of the one or more zones, identifying connections between two or more first-level nodes, the connections between the two or more first-level nodes based on connections between the point cloud data for the zones corresponding to the two or more first-level nodes, and defining a plurality of second-level nodes, individual second-level nodes corresponding to aggregated subsets of first-level nodes for which connections are identified.

BRIEF DESCRIPTION OF THE DRAWINGS

The technology disclosed herein, in accordance with one or more various embodiments, is described in detail with reference to the included figures. The figures include drawings that are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration, these drawings are not necessarily made to scale.

FIG. 4B illustrates an example point cloud along a roadway, generated in accordance with one or more embodiments of the present disclosure.

Figure 1:
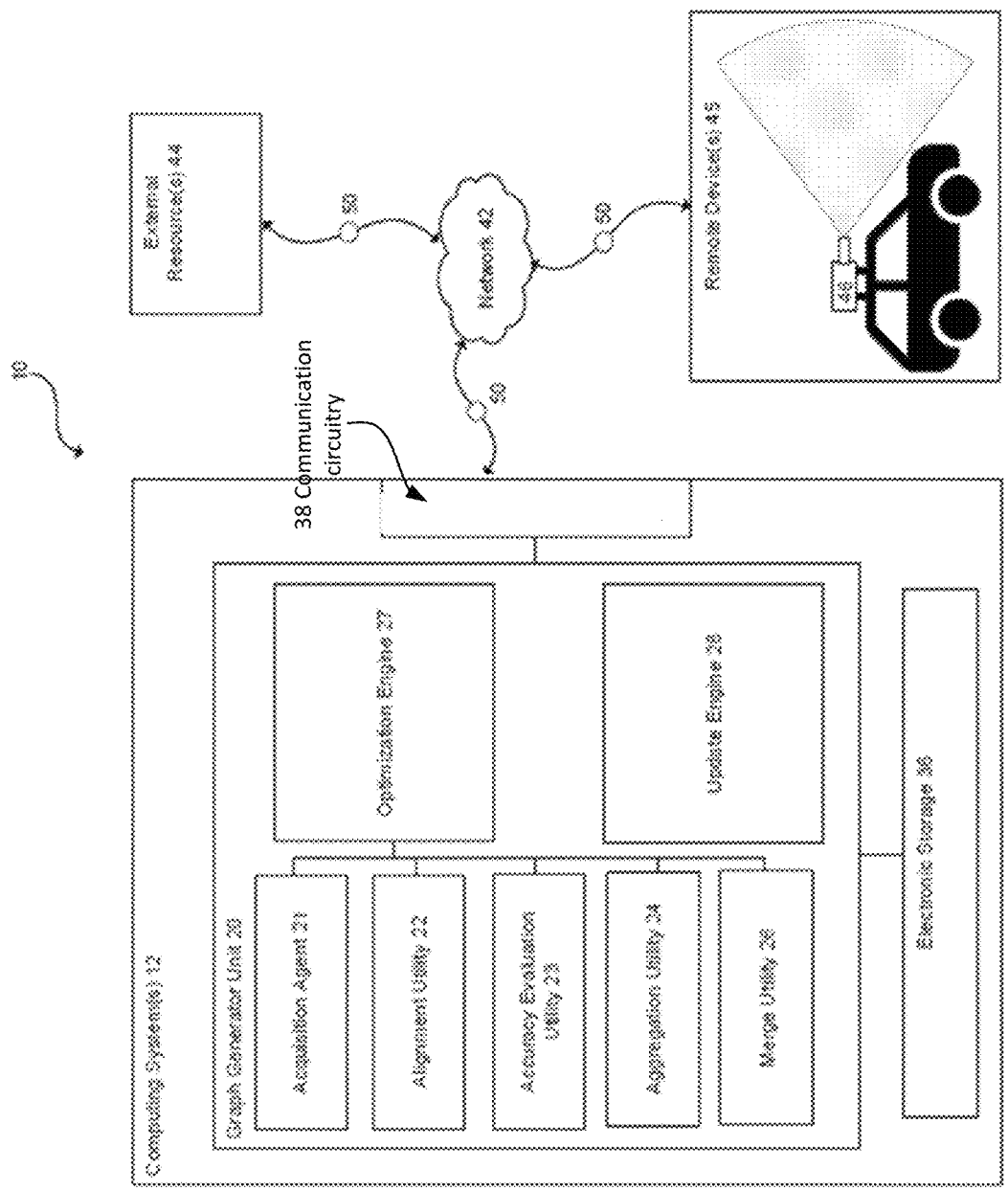
FIG. 1 illustrates an example system in accordance with one or more embodiments of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Databases of information may be represented graphically. A database including visual information of a geographical region (e.g., a city) may be represented by a graph including nodes (e.g., points on the graph associated with locations within the geographical region), and edges (e.g., lines on the graph representing a relationship or connection between nodes). Edges may be established between two or more nodes based on relationships between visual information (e.g., common objects) associated with the two or more nodes. Nodes may be associated with attributes (node attributes) indicative of the node's relationship with other elements of the graph (e.g., other nodes, edges, geographical information, etc.). For instance, node attributes might include information indicative of pose, bounding box, edges, location, name or ID, among other information. Edges may be associated with attributes (e.g., edge attributes) indicative of the relationship between two nodes connected by the given edge. For instance, an edge attribute may specify that portion of an object within the region associated with the first node is also within the region associated with the second node. Information about such relationships may be used in connection with constraints and boundary conditions in optimization operations.

Information indicative of pose may include pose details of the node itself with respect to a coordinate system, and/or the pose details of a sensor used during image capture with respect to the same or different coordinate system, etc.). Information indicative of bounding box may include bounding box details of the node (e.g., the geographical boundaries in the real world environment that correspond to the node). Information indicative of edges may include details of the edges connecting the node with other nodes (e.g., the constraints that define the edge, the matching information used to establish a connection between the nodes, etc.). Information indicative of location may include location details of the node, e.g., in the context of a coordinate system. For instance, location details might include GPS details of the geographic location corresponding to a node (e.g., GPS location(s) pinpointing a center-point or other point within or along the bounding box of the given node, GPS ranges defining the bounding box of the given node, street name/address corresponding to the node). Information indicative of a name may include name/ID details of the node itself, or objects falling within the region corresponding to the node. For instance, name/ID details may include a node name or ID number, a name or ID of a building or other structure falling within the geographical region associated with the given node, etc.).

FIG. 1 depicts a system 10 that may be implemented in accordance with one or more embodiments of the present disclosure. As shown, system 10 may include one or more computing system(s) 12 communicatively coupled via links 50 through network 42 with one or more remote device(s) 45, and one or more external resource(s) 44. Computing system(s) 12 may include one or more hardware processors configured with machine readable instructions which, upon execution, effectuate one or more features of the technology disclosed herein. As shown, computing system(s) 12 may include one or more of graph generator unit 20, communications circuitry 38, and electronic storage 36. Graph generator unit 20 may include an acquisition agent 21, alignment utility 22, accuracy evaluation utility 23, aggregation utility 24, merge utility 26, optimization engine, and update engine, among other components.

Graph generator unit 20 is configured to generate a road graph including a hierarchy of nodes, the hierarchy of nodes including two or more levels of nodes—for example, a first level of nodes and one or more higher-levels of nodes. In some embodiments, any given higher-level of nodes has a fewer number of nodes than the level beneath it and a greater number of nodes than the level above it (if any) in the hierarchy. Nodes of the first level (i.e., the lowest level of the hierarchy) correspond to individual zones within the geographical region being mapped. Such zones may be any size desired for the given application, and the size of the zone corresponding to any given node may be determined based on any number of factors (e.g., camera type, road profile, distance, speed limit, processing power, traffic levels, etc.). Additionally, such zones may overlap for neighboring nodes. Said differently, adjacent nodes of the first level are associated with overlapping zones. In some embodiments, an individual node may correspond to a zone spanning about between 100 and 200 meters in one or more directions in the physical environment. In other embodiments, an individual node may correspond to a zone spanning greater than or less than 100 meters. Nodes at the lowest level (i.e., first level) of the hierarchy comprise 3D point clouds representing surfaces of objects or other structures within the zone.

Acquisition agent 21 is configured to obtain point cloud data and feed such data (or a representation of such data) to the graph generator unit 20 to enable the graph generator unit 20 to build-out the nodes of the first level. Such node build-out may involve adding new nodes for previously unmapped zones within the geographical region of interest, updating current nodes of the graph with new or additional point cloud data, and registration of such point cloud data relative to previously obtained point cloud data and node information (e.g. pose, location, etc.). Acquisition agent 21 may obtain the point cloud data from any source. In some embodiments, the acquisition agent 21 may be communicatively coupled with one or more remote device(s) 45 including sensory equipment 46 for scanning real-world environments and/or generating point clouds representative of surfaces within such real-world environments. As shown, such remote device(s) 45 may be coupled with a mobile system (e.g., a vehicle) that can move throughout the environment of the geographical region of interest (i.e., the area being mapped). To build a road graph for a city such as Los Angeles, for example, acquisition agent 21 may obtain point cloud data from one or more LiDAR equipped vehicles as they drive along roadways within the Los Angeles city limits.

Such tools may include any type imaging equipment that outputs point cloud data (e.g., LiDAR detection system), or that outputs other data that can be leveraged to generate point cloud data (e.g., stereo imaging systems outputting stereo images of an environment that can, with computer vision technologies, be leveraged to create point clouds of the imaged environment). Acquisition agent 21 may further be configured to obtain data other than point cloud data (e.g. stereo image data) and generate point cloud data from such other data. Said differently, acquisition agent 21 may, alone or together with other elements of graph generator unit 20, apply computer vision operations to generate point cloud data from received data that is not in the form of point cloud data.

Figure 2A:
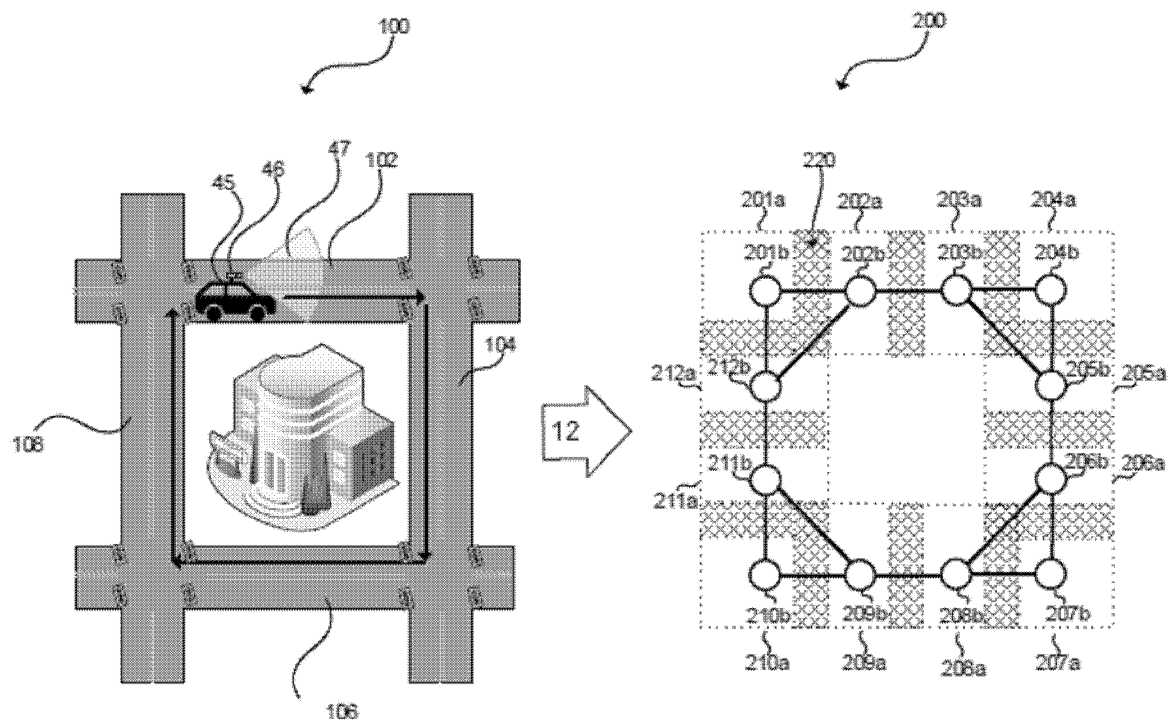
FIG. 2A illustrates a symbolic diagram depicting example remote device scanning a real world environment, then passing the collected information to a computing system of the present disclosure, which in turn generates a road graph including multiple nodes representing zones within the real world environment in accordance with one or more embodiments.
Figure 2A:
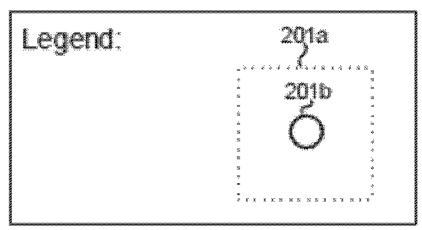

FIG. 2A illustrates symbolically an example remote device scanning a real world environment, passing the collected information to computing system 12, which in turn generates a road graph including multiple nodes representing zones within the real world environment. In the illustrated example, remote device 45 is a vehicle equipped with a LiDAR system 46 that scans the environment along a roadway within its scanning range 47 and generates point cloud data as it drives along the roads (e.g., along street 102, turning right onto street 104, then right again onto street 106, then right again onto street 108 and back to its starting position, for example). The remote device 45 scans the environment and generates point cloud data, then transmits such point cloud data (or a representation thereof) to system 12 for acquisition and processing by graph generator unit 20. Graph generator unit 20 may generate a road graph 200 comprising nodes that are made up of point clouds that cover a particular zone of real world space (e.g., 3D space). In the example illustration of a road graph 200 of FIG. 2A, a node may be represented by a dot (e.g., dot 201b) and the zone that corresponds to the node may include the area outlined by the dotted boundary box (e.g., boundary box 201a) surrounding the dot 201b, and overlapping areas between the zones of neighboring or nearby nodes is represented by the crosshatched regions (e.g., cross-hatched area 220). The lines between nodes in the road graph 200 represent connections (also called "edges") between the nodes based on a relationship between the nodes (here, overlapping zones).

Although not required by the present disclosure, for simplicity the zones associated with the nodes shown in FIG. 2A are uniform shapes (squares) and size. For further clarity, a single dot 201b and boundary box 201a are shown in the legend of FIG. 2A to provide a depiction of the same without the overlapping regions shown in the example road graph. It should be understood, however, that the volume of space that comprises a zone corresponding to a node can be circumscribed by any boundary construct, it need not be a cube, nor be uniform with zones of other nodes, nor be the same or similar size as zones for other nodes, etc. It should be further understood that, although the depiction is a simple two-dimensional topical view of a road graph, the boundary box 201a circumscribing a zone is three-dimensional (e.g., a cube, or other 3D form). As shown, the road graph 200 depicted shows a series of twelve nodes corresponding to zones 201a-212a and represented by dots 201b-212b.

Because the point clouds of adjacent nodes overlap (noted above), the point clouds from one adjacent node to the next may be aligned or otherwise connected based on the information available between both nodes. This is referred to herein as registration. Alignment utility 22 is configured to perform alignment operations on point clouds to align them with a given coordinate system (e.g., a global coordinate system) and/or registration operations on point clouds to align, or to enhance an alignment between, two or more successive point clouds together within the map. The alignment utility 22 is configured to perform operations to effectuate build-out of the 3D map of an environment within the geographical region of interest across multiple nodes.

To align or "register" point clouds, various algorithms may be employed. For example, in some embodiments alignment utility 22 may apply an Iterative Closest Point (ICP) algorithm to estimate the 3-D rigid transformation on point cloud data, and perform a point cloud registration operation based on the rigid transformation. In some embodiments, such algorithms may use a first point cloud as the reference (e.g., a constant) and then apply the estimated transformation to the original second point cloud. In some embodiments, this may involve identifying the rigid transformation for aligning the second point cloud with the first point cloud, then using the rigid transformation to transform the second point cloud to a reference coordinate system defined by, or in connection with, the first point cloud.

Accuracy evaluation utility 23 is configured to determine the accuracy of node pose and/or alignment. Accuracy evaluation utility 23 may make such a determination based on one or more accuracy parameters. Such parameters may include, but are not limited to: (i) the difference between a pre-alignment pose and a post-alignment pose of a given node or set of nodes (with a greater difference indicating less accuracy, and a smaller difference indicating greater accuracy), (ii) the consistency in orientation, dimension, or proportions of objects or features in a point cloud with known real-world objects or features in a zone (with a closer match of such parameters between objects or features in the point cloud and known real-world objects or features in the zone indicating greater accuracy)—for example, known dimensions of a Stop Sign that are more consistent with with the dimensions of the point cloud object associated with a Stop Sign in Node 1 than they are for the point cloud object associated with Node 2 suggests that Node 1's pose and/or alignment may be more accurate than Node 2's, (iii) the difference between a pose or alignment of a given node with respect to a connected node that is known (or has already been determined) to have a highly accurate pose or alignment with respect to a global coordinate system, etc.

In some embodiments, the quality of the registration depends on a variety of factors that may be optimized as new or additional information is obtained by system 10, e.g., from remote device(s) 45 or external resource(s) 44 via acquisition agent 21. Optimization engine 27 may be configured to apply optimization operation(s) to the point cloud data based on constraint(s), defined with respect to factor(s) in connection with a relationship between two or more nodes. In some embodiments, optimization may refer to the process minimizing errors of constraints related to one or more factors. There may be multiple types of constraints and/or factors.

For example, a factor may include the average distance between common points of two point clouds associated with two neighboring first nodes; a constraint defined with respect to such a factor may be a requirement that the average distance between common points be less than a particular value (e.g., average distance≤3 distance units); and the optimization operation may involve adjusting the relative positions of the point clouds such that they align in a manner that achieves the best or near best outcome given the average distance between common points in the point clouds associated with the nodes.

The foregoing is just one example of a factor, a constraint, and optimization operation. Other factor and/or constraint may also be used and defined, as desired, to form the basis of a particular optimization operation. Other such factors may include data noise, pose parameters of a node, pose information of a vehicle associated with an acquired point cloud being aligned, GPS information, IMU information, object or feature information from within a zone corresponding to a node (e.g., known object sizes, dimensions, locations, etc.); an alignment score computed for a collection of related first nodes that corresponds to an upper level node, etc.

Other such constraints (e.g., restriction(s) defining the limits on a factor that define the set of possible post-alignment relationships between the point clouds of two or more nodes) may include median distance between common points of two or more point clouds being less than a particular value; the number of common points across two or more point clouds falling within a particular distance of one another. The optimization operation may define a target outcome for the alignment between point clouds, and may effectuate adjustments to the alignment between point clouds to achieve the target outcome, or an outcome that comes nearer to the target outcome than another possible outcome. For example, under the constraint that a node cannot move more than a predefined amount relative its original location (or that it's pose cannot be reoriented more than a predefined amount relative to its original pose), an optimization operation may define a target outcome for the alignment between point clouds that minimizes the change in location or orientation relative to an original state.

Other optimization operations may include, by way of example only, minimizing the difference between pose parameters associated with two or more point clouds, maximizing overlap between two point clouds, etc. It should be understood that an "optimization operation" may refer to operations that achieve an outcome that seeks to minimize or maximize a particular variable within the scope of a constraint. However, it should also be appreciated that "optimization operations," as used herein, can also refer to operations that achieve an outcome that comes closer to the target outcome than another possible outcome within the scope of the constraint, but does not necessarily minimize or maximize the given variable that is the subject of the constraint. That is, an optimization operation may be configured to simply reduce the variable that is the subject of the constraint—for example, to reduce the average distance between common points, but not necessarily "minimize" such distance. For example, an optimization operation may be configured to adjust the point cloud alignment such that the average distance between common points is reduced as compared to a previous alignment achieved using a prior optimization operation. In some embodiments, an optimization operation may be configured to adjust the point cloud alignment such that the average distance between common points is maintained within a predetermined range of values.

Aggregation utility 24 is configured to generate or define upper level nodes by aggregating two or more adjacent nodes from the level beneath it in the node hierarchy. To identify nodes in one level that may be suitable for aggregation to generate or define a node of a higher level, aggregation utility 24 may determine which nodes of the lower level share common characteristics or are otherwise connected. For example, aggregation may identify a group of ten first nodes, each one adjacent to the next along a segment of a single roadway in a city's road network. In this example, because each first node overlaps with at least one other first node in ten nodes under consideration, the nodes may be aggregated and considered a single node at a higher level in the node hierarchy. Thus, at each successive level, the road graph can be simplified, yielding several advantages. For example, the road graph may be more efficiently optimized. To optimize the entire road graph, for example, optimization operations may be performed on nodes of higher levels first and thereby optimizing entire groups of lower level nodes together (instead of each individually).

Figure 2B:
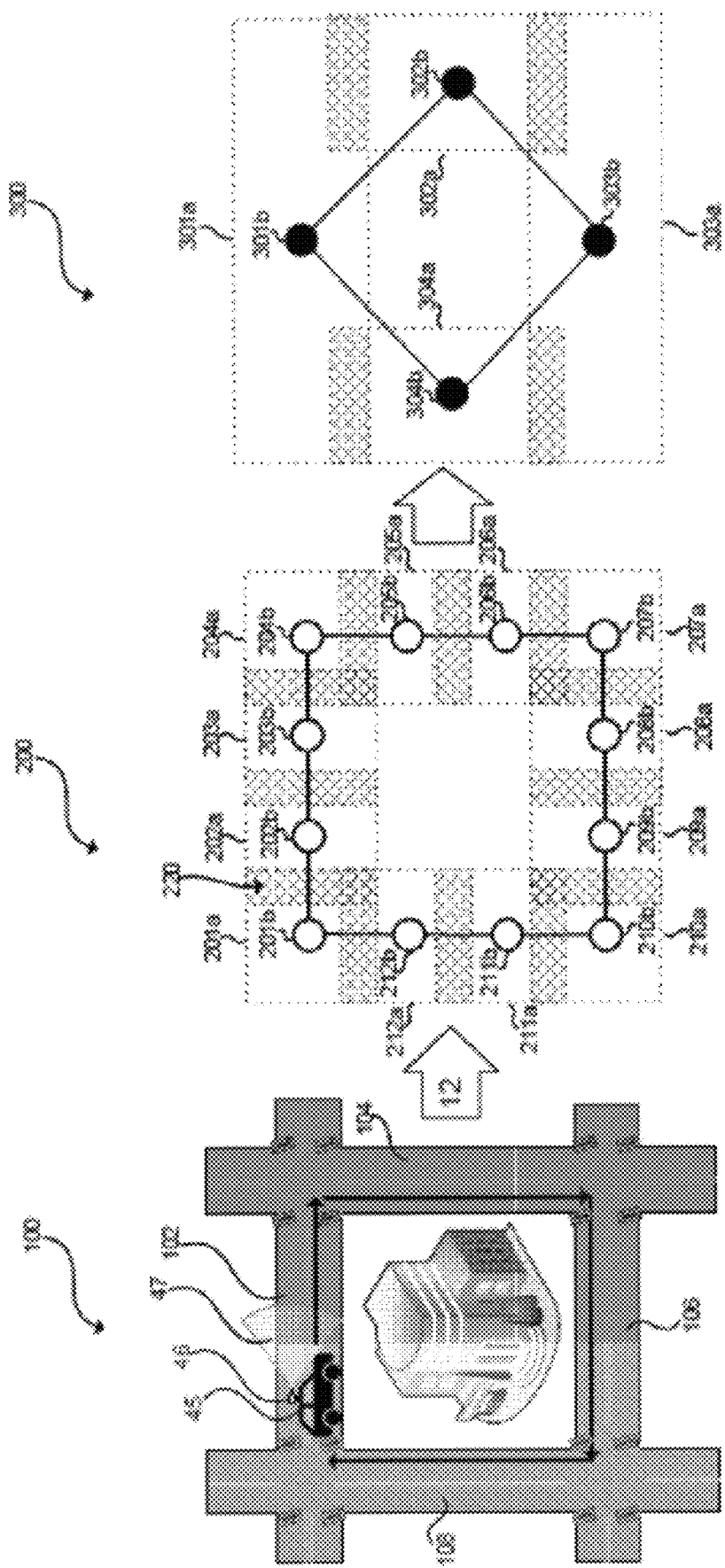
FIG. 2B illustrates the same symbolic diagram in FIG. 2A, with an added depiction of a road graph including second-level nodes constructed from aggregated first-level nodes.

In some embodiments, the aggregation can be designed as a road network. For example, first nodes on a road from one intersection to another may be aggregated as a second-level node. Extending the technology further, roads in a certain area (e.g. tens or hundreds of kilometers) may then be aggregated to generate or define third-level nodes. Just as first nodes may be connected because they are adjacent to one another and have at least some overlap in their point clouds, two or more upper level nodes may be connected if they have at least some overlap in their point clouds—that is, at least one first node (also referred to herein as a child node) of the first second-level node overlaps with at least one first node of a second second-level node, and so on and so forth for any N-level nodes as the hierarchy continues. An example set of second-level nodes generated or defined by the presented technology, constructed by aggregating multiple first level nodes, is shown in FIG. 2B. Here again, just as in FIG. 2B, the lines between nodes in the road graph 300 represent connections (also called "edges") between the nodes based on a relationship between the nodes (here, overlapping zones). It should be appreciated that the accuracy (or strength) of a connection between any two upper-level nodes becomes greater with increased connections in the levels beneath the given upper level (e.g., the connections between nodes are stronger if there are more lower level overlaps).

FIG. 2B illustrates the example introduced above with reference to FIG. 2A, here depicting another level of nodes (e.g., a second level of nodes) that may be generated or defined by aggregating two or more connected lower level nodes (e.g., the first level of nodes). Road graph 300 depicts a second-level of nodes. Node 301 corresponds to the point cloud data associated with the zone circumscribed by boundary box 301a, which is constructed by aggregation utility 24 aggregating two or more connected nodes.

For example, as shown in FIG. 2B, second-level node 301b comprises the point cloud data associated with the zone circumscribed by boundary box 301a, which corresponds to an aggregation of the point cloud data associated with the zones circumscribed by boundary boxes 201b-204b of road graph 200 along roadway 102 depicted in real world environment 100; second-level node 302b comprises the point cloud data associated with the zone circumscribed by boundary box 302a, which corresponds to an aggregation of the point cloud data associated with the zones circumscribed by boundary boxes 205b-206b of road graph 200 along roadway 104 depicted in real world environment 100; second-level node 303b comprises the point cloud data associated with the zone circumscribed by boundary box 303a, which corresponds to an aggregation of the point cloud data associated with the zones circumscribed by boundary boxes 207b-210b of road graph 200 along roadway 106 depicted in real world environment 100; and second-level node 304b comprises the point cloud data associated with the zone circumscribed by boundary box 304a, which corresponds to an aggregation of the point cloud data associated with the zones circumscribed by boundary boxes 211b-212b of road graph 200 along roadway 108 depicted in real world environment 100. Any combination of connected lower level nodes may be selected for aggregation to construct upper level nodes, depending on the criteria desired/applied by aggregation utility 24. And as noted herein, the present technology extends to N-levels of nodes, depending on how large scale the the desired mapping is (e.g., for a road graph corresponding to a map of a small city, there may only be first level nodes (also referred to herein as first nodes) and second level nodes; for a road graph of corresponding to a map of a large city, there may be first, second, and third level nodes; for a road graph of corresponding to a map of an entire state, there may be first, second, third, and fourth level nodes; for a road graph of corresponding to a map of multiple states, there may be first, second, third, fourth, and fifth level nodes, etc.

Referring back now to FIG. 1, in some embodiments, system 10 may include many remote devices 46 sending point cloud data to computing system(s) 12 to be populated into the map. Periodically, the same zone will be covered by multiple remote device(s) 45, or in some instances the same remote device 45 may cover the same route multiple times. In such cases, multiple nodes may be generated that cover substantially the same space. Instead of retaining separately defined nodes that cover substantially the same area, merge utility 26 may be configured to determine when two or more defined or generated nodes cover substantially the same area and effectuate a merge operation.

A merge operation combines the point cloud data of two duplicative nodes into just one node, thereby simplifying the nodal representation of the road graph, and densifying the point clouds to enrich the mapped structures within the given zone. So as nodes of the road graph are locked, the graph can be simplified by merging nearby nodes that cover substantially the same space, while still maintaining the broader structure of road network. Thus, point cloud data associated with a given zone may be merged with other point cloud data for the same zone (e.g., by merge utility 26) in order to simplify/reduce the number of first nodes needed to cover the space being mapped, and also to densify the point clouds associated with such first nodes of the road graph. An example of such merge operation is shown in the illustrations provided as FIGS. 3A-3B.

Figure 3A:
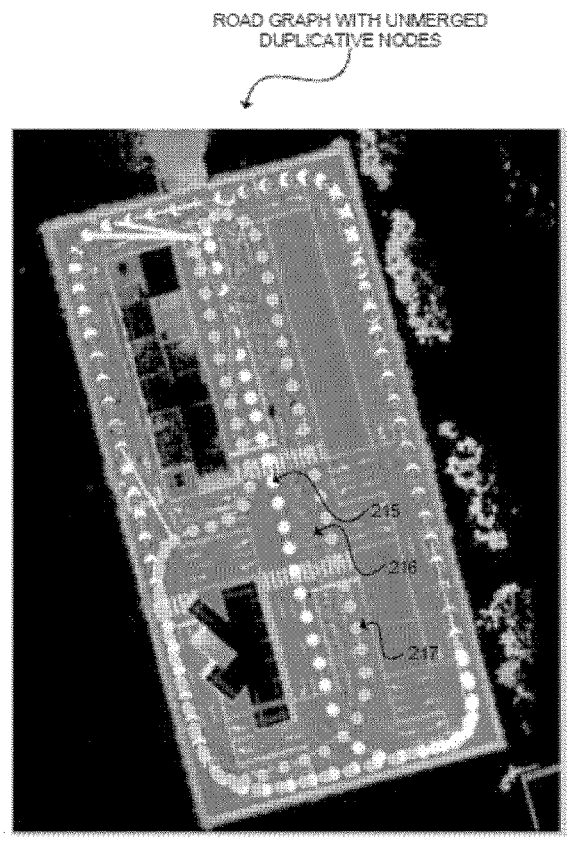
FIG. 3A illustrates an example road graph prior to a merge operation of the present disclosure, depicted as overlaying a road network of a real world environment mapped in accordance with embodiments of the present disclosure.
Figure 3B:
FIG. 3B illustrates an example road graph after a merge operation of the present disclosure, again depicted as overlaying the same road network shown in FIG. 3A, in accordance with embodiments of the present disclosure.

FIG. 3A illustrates an example road graph prior to a merge operation, shown overlaying a road network of a real world environment mapped in accordance with the present disclosure. FIG. 3B illustrates an example road graph after a merge operation, again shown overlaying the same road network shown in FIG. 3A, in accordance with the present disclosure.

As shown by way of example, FIG. 3A depicts a series of nodes generated or defined based on point cloud data acquired from multiple remote device(s) 45 that have captured point cloud data that in some instance cover roughly the same zone. For example, the white dots 215 in FIG. 3A may correspond to point cloud data along a first path, the blue dots 216 in FIG. 3A may correspond to point cloud data along a second path, and the yellow dots 217 in FIG. 3A may correspond to point cloud data along a third path. As shown in FIG. 3A, some of the nodes are very close to one another, which may have been the result of, for example, different remote devices 45 (vehicles) collecting point cloud data while traveling different lanes on the same roadway, thereby leaving the nodes they generate slightly displaced but with point clouds that still cover substantially the same space (or same relevant space). Merge utility 26 may merge the point cloud data from such duplicative nodes, thereby simplifying/reducing the number of first nodes used to represent a particular portion of the road graph, while retaining the information from all nodes in a manner that densifies and enhances the point cloud associated with the remaining/resultant node (i.e., the node the data was merged into).

FIG. 3B illustrates the simplified road graph after merge utility 26 has applied one or more merge operations. As shown, many of the white dots 215 (representing nodes) have been merged into either blue dots 216 (representing other nodes) or yellow dots 217 (representing other nodes); similarly, many of the blue dots 216 (representing nodes) have been merged into either white dots 215 (representing other nodes) or yellow dots 217 (representing other nodes); and similarly, many of the yellow dots 217 (representing nodes) have been merged into either blue dots 216 (representing other nodes) or white dots 215 (representing other nodes). In sum, the merge operations effectuated by merge utility 26 combined point cloud data from nodes that covered substantially duplicative zones of space, and populated just one of such nodes with the point cloud data from the other duplicative node(s).

Still referring to FIG. 3B, but now with reference back to the aggregation utility 24 introduced above, graph generator unit 20 may define or generate higher level nodes by aggregating connected lower level nodes. For example, aggregation utility 24 of graph generator unit 20 may aggregate all of the nodes represented by the white dots 215 to construct a single second level node; aggregation utility 24 may further aggregate all of the nodes represented by the blue dots 216 to construct another second level node; and aggregation utility 24 may further aggregate all of the nodes represented by the yellow dots 217 to construct another second level node. Thus, the road graph shown in FIG. 3B may be simplified even further, and be represented by just three second-level nodes made up of the lower-level nodes as described.

In some instances, there are structural changes within one or more zones associated with one or more nodes, and updates to the road graph and map may need to be made. Graph generator unit 20 may be equipped with an update engine 28 for the purpose of providing such updates in an intelligent fashion.

Update engine 28 is configured to detect when new point cloud information acquired for a zone that has already been mapped is sufficiently different than the prior point cloud information to warrant an update to the map. Whether the new point cloud information is "sufficiently different" may depend on the desired application, and how significant certain updates are to the application the map is being used for. For instance, for a simple map routing application, a user might be running to help them drive from one location to another (e.g., Google Maps), the addition of a sidewalk on a roadway that makes the actual roadway narrower by four feet may be deemed not significant enough to warrant any updates to the map. However, on the other hand, such a four foot change in the width of a road may be significant enough to warrant an update to a road network mapping application being used, in whole or in part, as an input that controls the movements of an intelligent or autonomous vehicle on the roadways. Thus, to determine if new point cloud information acquired for a zone that has already been mapped is sufficiently different from the prior point cloud information to warrant an update, update engine 28 may be configured to determine whether the detected change between new point cloud information as compared to earlier acquired point cloud information exceeds a predefined threshold. The predefined threshold may be defined by a user, and may be based on any criteria of interest (e.g., road structure changes, crosswalk changes, traffic sign changes, building changes, etc.). Upon detecting a change that is sufficient to warrant an update, update engine 28 may effectuate the update for the corresponding node or nodes—whether by replacing the old point cloud data with the new (e.g., for moved or removed structures, such as a removed bridge), or merging the new point cloud data with the old point cloud data (e.g., for mere additions, such as a new stop light). In this way, updates involving significant changes to the point clouds are only populated into the map framework when needed.

Figure 4A:
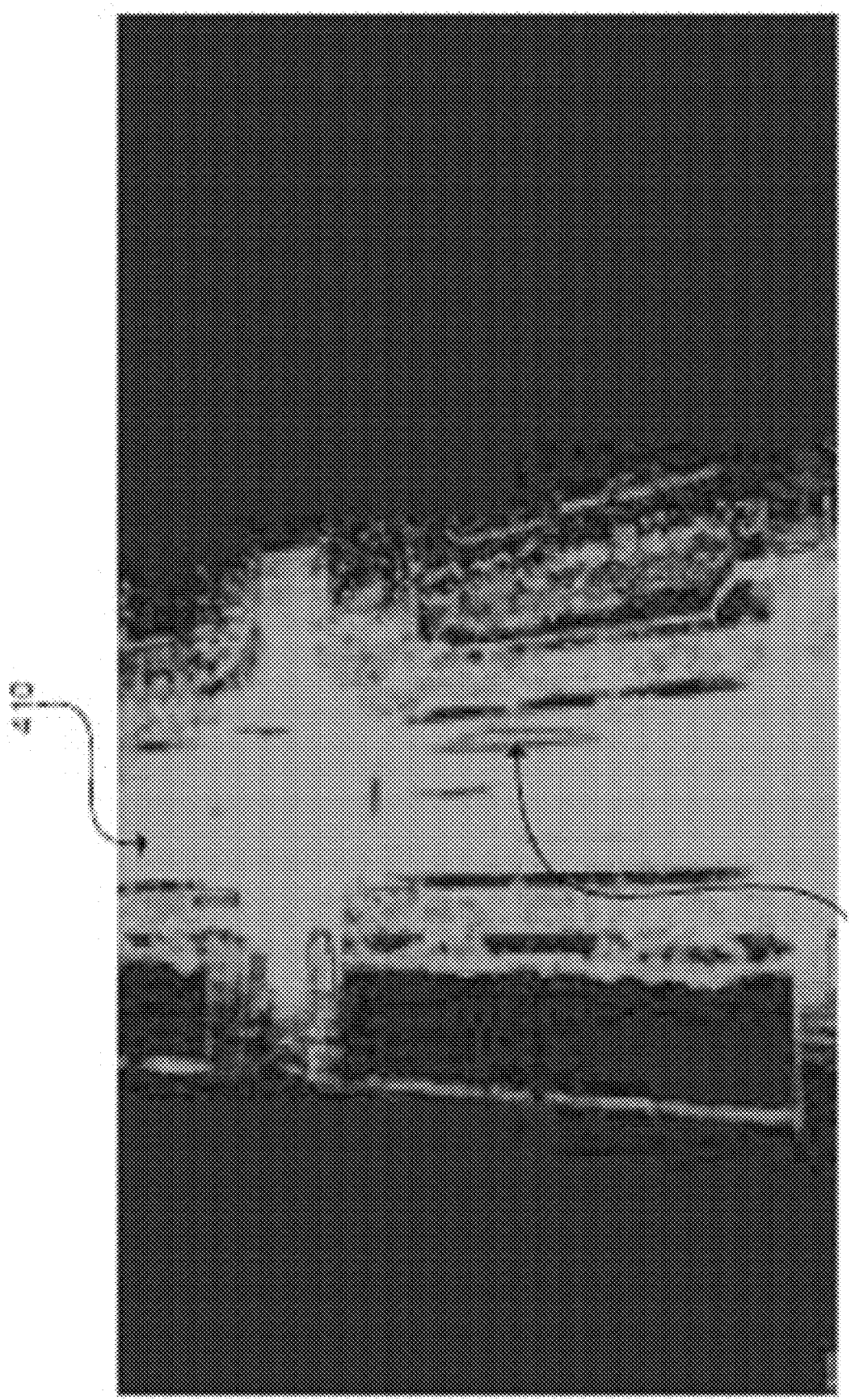
FIG. 4A illustrates an example point cloud along a roadway, generated in accordance with one or more embodiments of the present disclosure.

FIG. 4A illustrates a point cloud for a region where previously obtained point cloud data 410 (represented in a first color) and newly obtained point cloud data 412 (represented in a second color). The newly obtained point cloud data 412 may include dissimilar points, similar points, or duplicate points to previously obtained point cloud data. For purposes of FIGS. 4A-4B, it should be understood that points shown in green are from previously obtained point cloud data, points in blue are duplicate points (or similar points) to previously obtained point cloud data 410, and points in red are dissimilar points that represent a significant change relative to the previously obtained point cloud data.

As shown, FIG. 4A illustrates a point cloud for a region where previously obtained point cloud data 410 is shown in a first color (represented in green) and newly obtained point cloud data 412 is shown in a second color (represented in blue). The newly obtained point cloud data 412 may be duplicate points or similar points to the previously obtained point cloud data 410 (e.g., the blue points are duplicates of previous points (which would show up as green if not for the overlapping blue), or similar enough to the previously obtained point cloud data 410 (e.g., determined based on a predefined threshold, for instance, a similarity threshold, to form the basis of such a determination)). Such duplicate or similar point cloud data may be determined by update engine 28 to be insignificant enough that an update to the map is not necessary.

As shown, FIG. 4B illustrates a point cloud for a region where previously obtained point cloud data 410 is shown in a first color (represented in green) and newly obtained point cloud data 414 is shown in a second color (represented in red). The newly obtained point cloud data 414 may be dissimilar to the previously obtained point cloud data 410 (e.g., the red points are dissimilar to previous points (e.g., determined based on a predefined threshold, for instance, a similarity threshold, to form the basis of such a determination)). Such dissimilar point cloud data may be determined by update engine 28 to be significant enough that an update to the map is necessary.

Figure 5A:
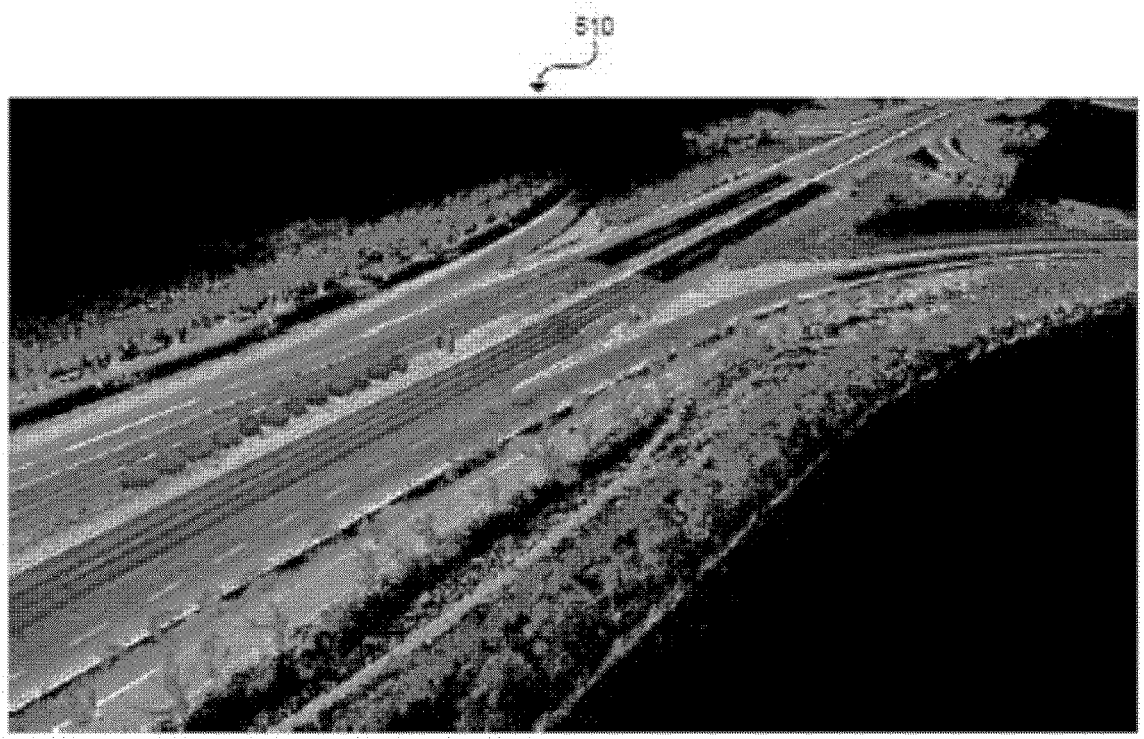
FIG. 5A illustrates an example 3D point cloud map constructed in accordance with one or more embodiments of the present technology.
Figure 5B:
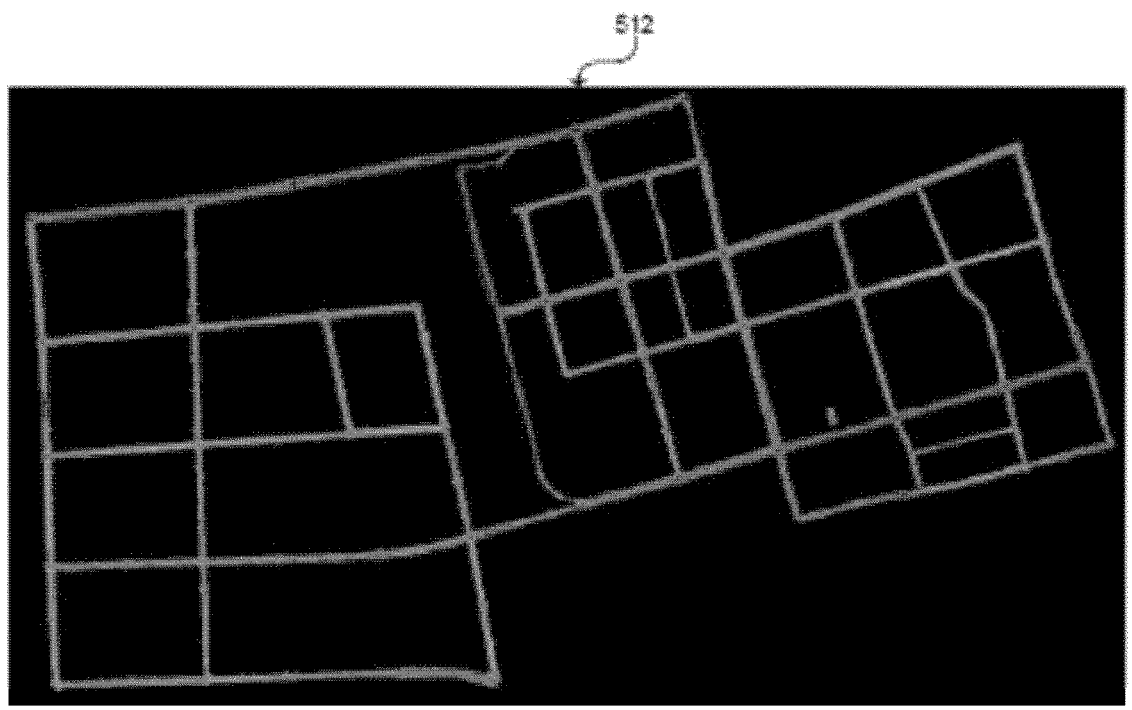
FIG. 5B illustrates an example 2D projection of a road map constructed in accordance with one or more embodiments of the present technology.

FIG. 5A illustrates an example map constructed in accordance with one or more embodiments of the present technology. The map 510 is an example of a large scale map with centimeter level resolution. FIG. 5B illustrates an example map constructed in accordance with one or more embodiments of the present technology. The map 512 is a 2D map projection of a road network, constructed in accordance with one or more embodiments of the present technology.

Referring back now to FIG. 1, acquisition agent 21, alignment utility 22, accuracy evaluation utility 23, aggregation utility 24, merge utility 26, optimization engine 27 may be configured to work in concert to both build a new graph, optimize a graph, merge two or more graphs or segments of two or more graphs. As noted previously, an optimization operation may define a target outcome for the alignment between point clouds, and may effectuate adjustments to the alignment between point clouds to achieve the target outcome, or an outcome that comes nearer to the target outcome than another possible outcome. With the multi-level node road graph technology of the present disclosure, higher level nodes may be leveraged to effectuate top-down optimization, and lower level nodes may be leveraged to effectuate bottom-up optimization.

Figure 6A:
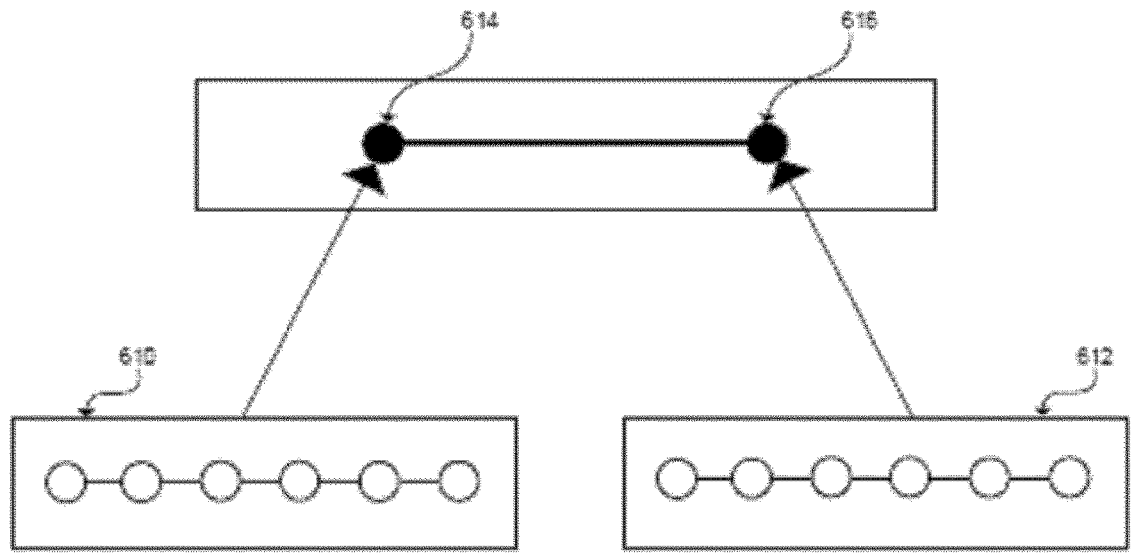
FIG. 6A illustrates a symbolic representation of bottom-up optimization flow in accordance with one or more embodiments of the present disclosure.

Optimization can be performed at any level and any part of a graph. In some embodiments, optimization engine 27 performs a bottom-up optimization operation. Bottom-up optimization occurs when optimization engine 27 executes optimization operations on an aggregated group of lower level nodes that define an upper-level node, and then base a change in the upper-level node on the result of the optimization operations on the lower level nodes. FIG. 6A depicts a symbolic representation of bottom-up optimization. As shown, optimization engine 27 executes optimization operations on an aggregated group of lower-level nodes 610 that define an upper-level node 614 and an aggregated group of lower-level nodes 612 that define an upper-level node 616, and then propagates a change in the upper-level nodes 614 and 616 based on the result of the optimization operations on the lower-level nodes. That is, the constraints of the lower-level nodes influence the optimization of the upper-level nodes (i.e., the optimization of the lower-level nodes may be pushed down to the upper-level nodes).

Figure 6B:
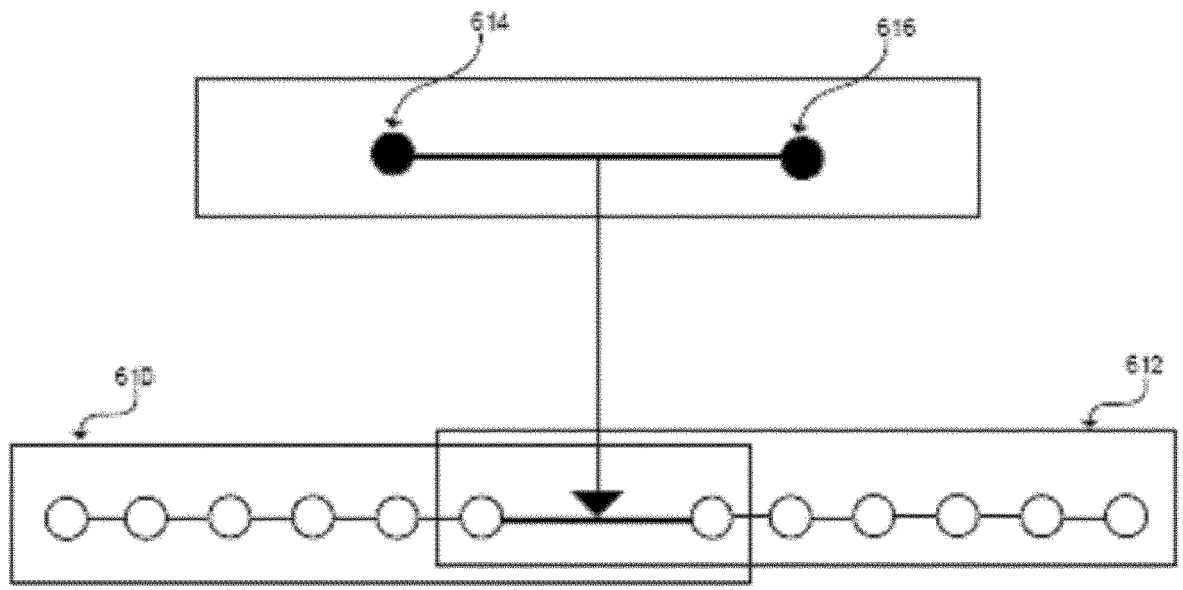
FIG. 6B illustrates a symbolic representation of top-down optimization flow in accordance with one or more embodiments of the present disclosure.

In some embodiments, optimization engine 27 performs a top-down optimization operation. Top down optimization occurs when optimization engine 27 executes optimization operations on an upper-level node, and then bases a change in the lower-level nodes that define the upper-level node on the result of the optimization operations on the upper-level nodes. FIG. 6B depicts a symbolic representation of top-down optimization. As shown, optimization engine 27 executes optimization operations on an upper-level node 614 and an upper-level node 616, and an aggregated group of lower-level nodes 612 that define an upper-level node 616, and then propagates a change in the aggregated group of lower-level nodes 610 and 612 that define upper-level nodes 614 and 616 based on the result of the optimization operations on the upper-level nodes 614 and 616. That is, the constraints between the upper-level nodes may influence the optimization of the lower-level nodes (i.e., the optimization of the upper level nodes may be pushed down to the lower-level nodes).

Referring again to FIG. 1, as noted above the merge utility 26 may be configured to determine when two or more defined or generated nodes cover substantially the same area and effectuate a merge operation. In further embodiments, merge utility 26 may be configured not just to merge or combine the point clouds of two or more nodes individually, but may further be configured to merge larger sections of road graphs together, each of which already contain multiple nodes. That is, merge utility 26 may be configured to build a new graph by building connections between nodes one at a time graphs and performing optimization on that basis of such connections; and/or merge utility 26 may be configured to extend a graph by merging two previously built graphs together by building connections between certain pieces of the graphs and performing optimization on that basis of such connections. In either case, accuracy evaluation utility 23 may influence the optimization by providing an accuracy score that may serve as a weighting factor in the optimization.

That is, in some embodiments if one node (in the case of merging two nodes) or one graph (in the case of merging graphs) is determined by accuracy evaluation utility 23 to be of greater quality (i.e., higher accuracy) than the node or graph with which it is being merged, optimization engine 27 may define constraints such that the initial state (e.g., location, pose, etc.) of the higher quality node or graph may be made more resistant to change than the initial state (e.g., location, pose, etc.) of the lower-quality node or graph. In some embodiments, map quality (i.e., map accuracy) can form the basis of assigning different covariances to one or more constraints of the maps and/or graphs that may be generated in accordance with the present disclosure.

In some embodiments, if one node (in the case of merging two nodes) or one graph (in the case of merging graphs) is determined by accuracy evaluation utility 23 to be of greater quality (i.e., higher accuracy) than the node or graph with which it is being merged, optimization engine 27 may optimize the entire graph of lower quality nodes and only a portion of the nodes from the high quality graph, thereby leaving a greater portion of the higher quality graph to remain constant (e.g., unchanged) and providing the boundary conditions for the optimization of the lower quality graph.

Figure 7A:
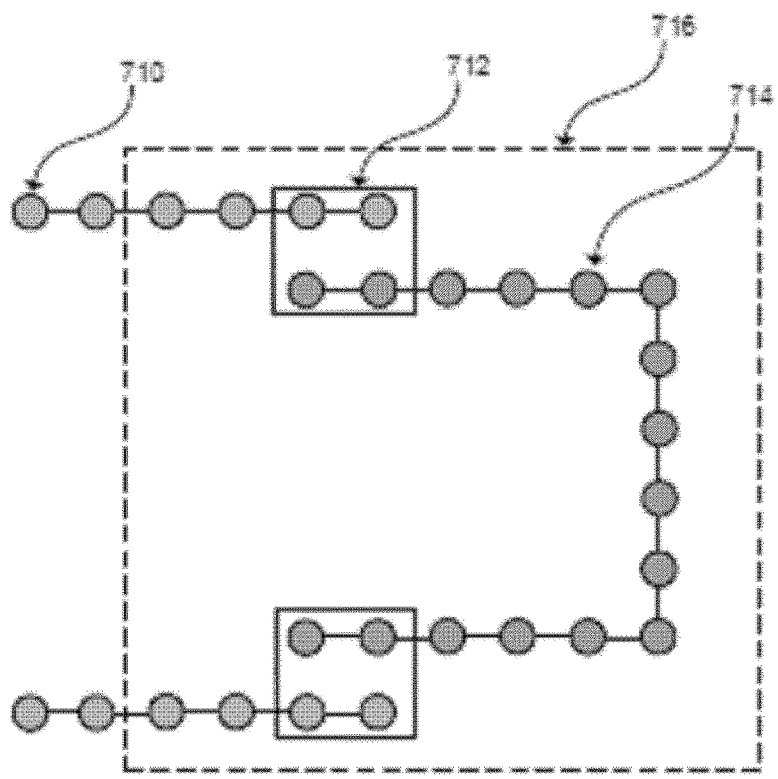
FIG. 7A illustrates a symbolic representation of a merge operation wherein a smaller and lower-accuracy graph is merged with a larger and higher-accuracy graph in accordance with one or more embodiments of the present disclosure.

FIG. 7A illustrates a symbolic representation of a merge operation wherein a smaller and lower-accuracy graph is merged with a larger and higher-accuracy graph. As shown, FIG. 7A includes a high quality road graph comprising a series of nodes 710 (shaded yellow) being merged with a low quality road graph comprising a series of nodes 714 (shaded blue). The area that is subject to optimization (and thus realignment) is denoted by dotted outline 716, where the area of overlap that provides the boundary conditions is denoted by solid outline 712.

In other embodiments, accuracy evaluation utility 23 may determine that the two nodes sought to be merged, or the two graphs sought to be merged are of a similar quality, for example both high quality or both low quality. In the case of merging two low quality graphs, a greater portion of the supporting area as between the two graphs may be used to provide boundary conditions for the optimization. In the case of merging two high quality maps, a lesser portion of supporting area as between the two graphs may be subjected to optimization operations (and a lesser amount of supporting area used to provide boundary conditions).

Figure 7B:
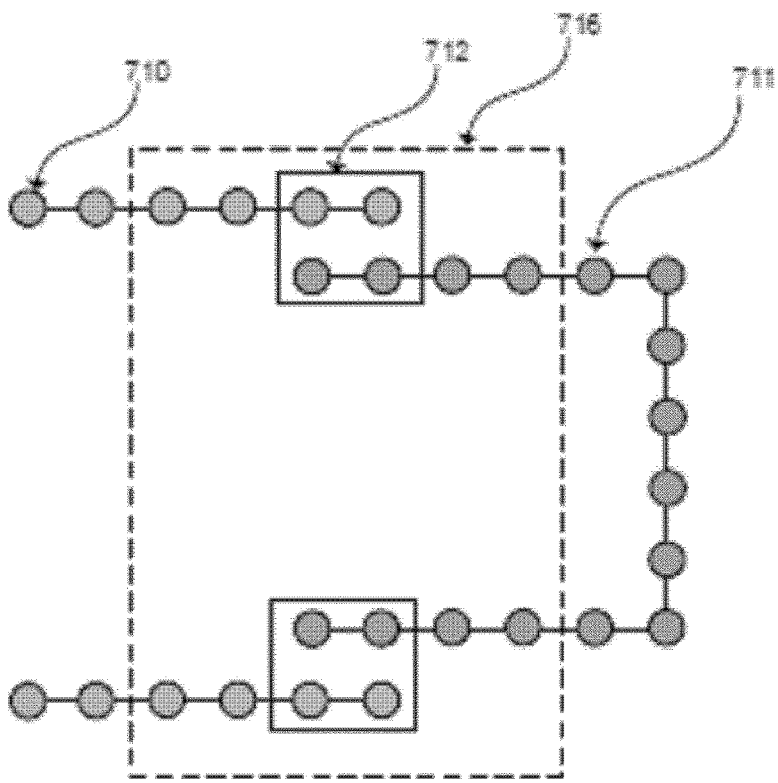
FIG. 7B illustrates a symbolic representation of a merge operation wherein a two high-quality graphs are merged together in accordance with one or more embodiments of the present disclosure.

FIG. 7B illustrates a symbolic representation of a merge operation wherein a two high-quality graphs are merged together. As shown, FIG. 7A includes a high quality road graph comprising a series of nodes 710 (shaded yellow) being merged with another high quality road graph comprising a series of nodes 711 (shaded green). The area that is subject to optimization (and thus realignment) is denoted by dotted outline 716, where the area of overlap that provides the boundary conditions is denoted by solid outline 712. As may be appreciated by observing FIG. 7A and FIG. 7B, the nodes subject to optimization are fewer when two high quality graphs are merged than when a lower quality graph is involved.

As accuracy evaluation utility 23 determines that a node, a set of nodes, or an entire graph are sufficiently accurate, the graph generator unit 20 may "lock" such a node, such a set of nodes, or such an entire graph. "Locking" refers to restricting further optimization or alignment. High quality nodes can be locked such that further computational power isn't expended attempting to changing something already determined to be accurate; and furthermore, once a node, set of nodes, or graph is locked, it can be used to provide boundary conditions for optimizing other nodes, sets of nodes, or graphs as they are added/merged with the locked node, set of nodes, or graph. The result is that as the accuracy evaluation utility 23, merge utility 26, and optimization engine 27 (and aggregation utility 24 when the foregoing is applied to higher level nodes) may operate in concert such that graph generator unit 20 build out and extend large scale high resolution maps and associated road graphs that are more efficient to build and manage, and computationally less expensive to optimize and update.

Figure 8:
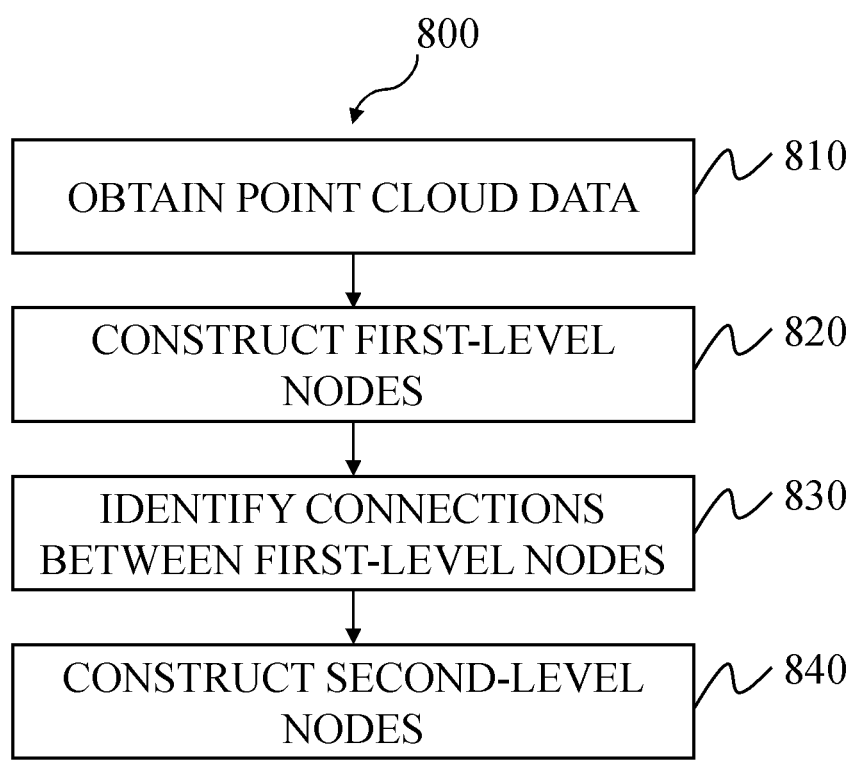
FIG. 8 illustrates an operational flow diagram representing a process that may be implemented in accordance with one or more embodiments of the present disclosure.

FIG. 8 illustrates an example method that may be implemented in accordance with one or more embodiments of the present disclosure. At operation 810, method 800 may include obtaining point cloud data. For example, operation 810 may include obtaining point cloud data from one or more sources corresponding to one or more zones within a real-world space, the point cloud data representing surface features of structures detected within the one or more zones. At operation 820, method 800 may include constructing first-level nodes. For example, operation 820 may include defining a plurality of first-level nodes based on the point cloud data, individual first-level nodes corresponding to obtained point cloud data corresponding to individual zones of the one or more zones. At operation 830, method 800 may include identifying connections between first-level nodes. For example, operation 830 may include identifying connections between two or more first-level nodes where the connections between the two or more first-level nodes are based on connections between the point cloud data for the zones corresponding to the two or more first-level nodes. At operation 840, method 800 may include constructing a plurality of second-level nodes. For example, operation 840 may include defining individual second-level nodes corresponding to aggregated subsets of first-level nodes for which connections are identified.

Figure 9:
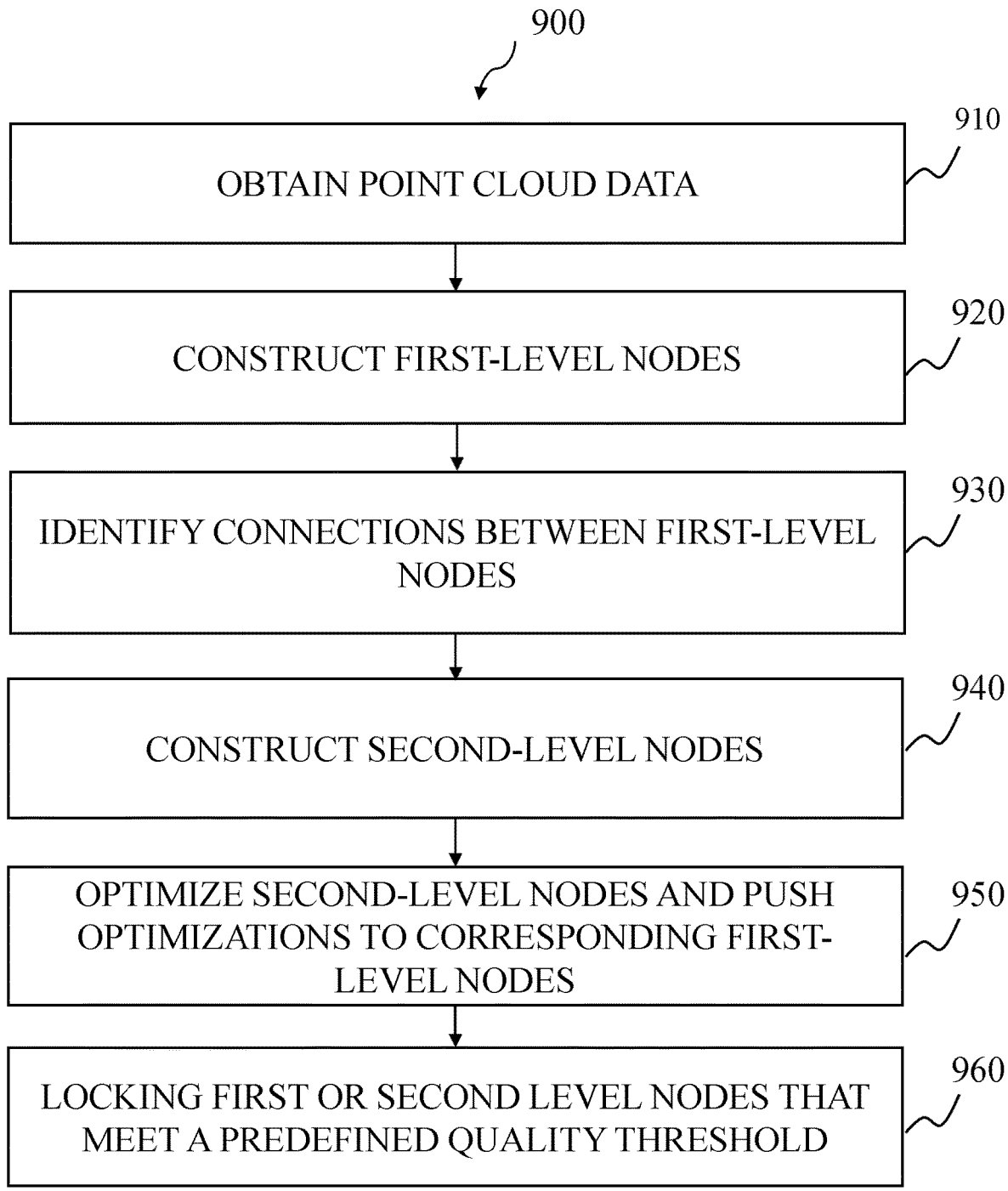
FIG. 9 illustrates another operational flow diagram representing a process that may be implemented in accordance with one or more embodiments of the present disclosure.

FIG. 9 illustrates an example method that may be implemented in accordance with one or more embodiments of the present disclosure. At operation 910, method 900 may include obtaining point cloud data. For example, operation 910 may include obtaining point cloud data from one or more sources corresponding to one or more zones within a real-world space, the point cloud data representing surface features of structures detected within the one or more zones. At operation 920, method 900 may include constructing first-level nodes. For example, operation 920 may include defining a plurality of first-level nodes based on the point cloud data, individual first-level nodes corresponding to obtained point cloud data corresponding to individual zones of the one or more zones. At operation 930, method 900 may include identifying connections between first-level nodes. For example, operation 930 may include identifying connections between two or more first-level nodes where the connections between the two or more first-level nodes are based on connections between the point cloud data for the zones corresponding to the two or more first-level nodes. At operation 940, method 900 may include constructing a plurality of second-level nodes. For example, operation 940 may include defining individual second-level nodes corresponding to aggregated subsets of first-level nodes for which connections are identified. At operation 950, method 900 may include optimizing second-level nodes and pushing such optimizations down to lower level nodes. For example, operation 950. For example, operation 950 may involve adjusting one or more of a pose or a location of each first-level node in two subsets of first-level nodes based on a connection between the two second-level nodes corresponding to the two subsets of first-level nodes. At operation 960, method 900 may include locking one or more first or second level nodes (or higher level nodes, if any) that meet a predefined quality threshold (e.g., that have an accuracy score that exceeds a predetermined figure).

Figure 10:
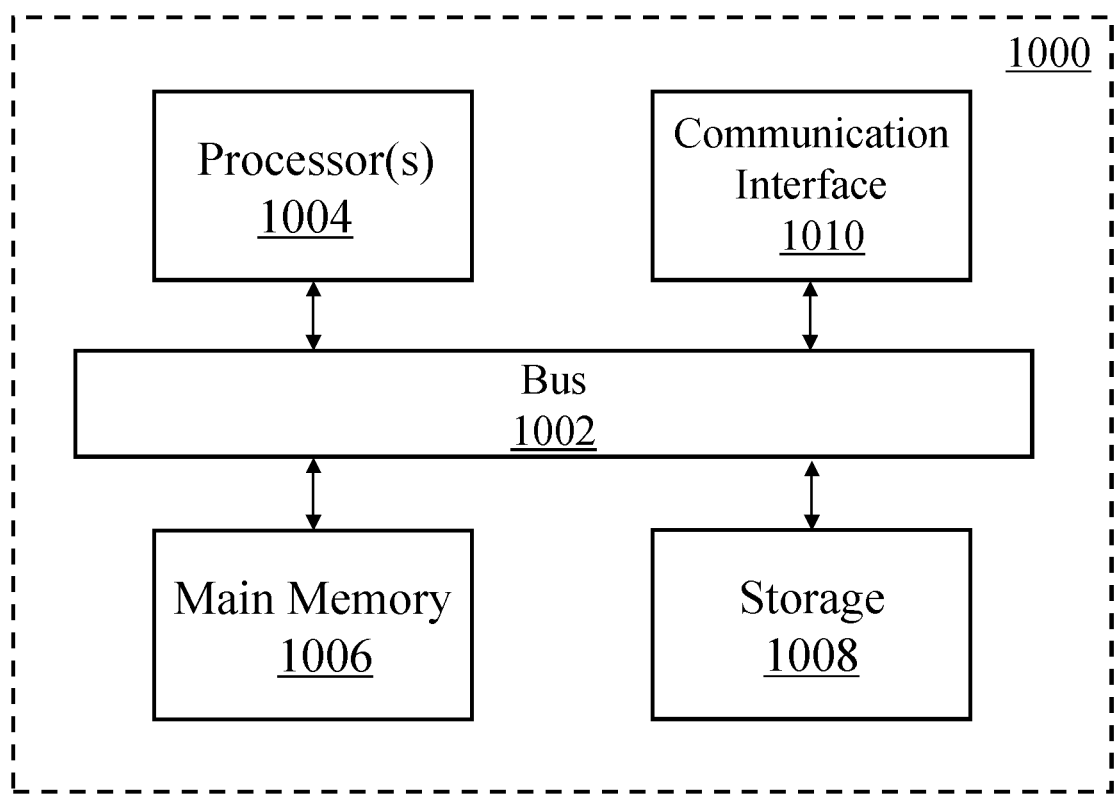
FIG. 10 illustrates computer system 1000 upon which any of the embodiments described herein may be implemented.

FIG. 10 is a block diagram that illustrates a computer system 1000 upon which any of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor(s) 1004. Main memory 1006 also may be used for storing temporary variables or other intermediate information during execution of instructions to be executed by processor(s) 1004. Such instructions, when stored in storage media accessible to processor(s) 1004, render computer system 1000 into a special-purpose machine that is customized to perform the operations specified in the instructions. Main memory 1006 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, and networked versions of the same.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1008. Execution of the sequences of instructions contained in main memory 1006 causes processor(s) 1004 to perform the process steps described herein.

For example, the computing system 1000 may be used to implement the computing system 12 or one or more components of the computing system 12 shown in FIG. 1. As another example, the process/method shown in FIGS. 8-9 and described in connection with this disclosure may be implemented by computer program instructions stored in main memory 1006. When these instructions are executed by processor(s) 1004, they may perform the steps as shown in FIGS. 8-9 and described above. In alternative embodiments, hard-wired circuitry may be used in place of or in combination with software instructions.

The computer system 1000 also includes a communication interface 1010 coupled to bus 1002. Communication interface 1010 provides a two-way data communication coupling to one or more network links that are connected to one or more networks. As another example, communication interface 1010 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system comprising:
   one or more processors; and
   a memory storing instructions that, when executed by the one or more processors, cause the system to:
   obtain point cloud data from one or more sources corresponding to one or more zones within a real-world space, the point cloud data representing surface features of structures detected within the one or more zones;
   define a plurality of first-level nodes based on the point cloud data, individual first-level nodes corresponding to obtained point cloud data corresponding to individual zones of the one or more zones;
   identify connections between two or more first-level nodes, the connections between the two or more first-level nodes based on connections between the point cloud data for the zones corresponding to the two or more first-level nodes; and
   define a plurality of second-level nodes, individual second-level nodes corresponding to aggregated subsets of first-level nodes for which connections are identified,
   wherein the instructions, when executed by the one or more processors, cause the system to:
   identify two or more first-level nodes corresponding to zones that are at least partially overlapping;
   align the two or more first-level nodes together in accordance with a constraint;
   compute an accuracy score for the alignment between the two or more first-level nodes, the accuracy score computed based on a predetermined criteria for measuring a quality of a fit between point clouds; and
   lock one or more of a location parameter and pose parameter of a first-level node of the two or more first-level nodes when the accuracy score for the alignment of the two or more first-level nodes meets a predefined high-quality threshold.

2. The system of claim 1, wherein the memory further stores instructions that, when executed by the one or more processors, cause the system to:
   identify one or more pose parameters of a first-level node based on the pose parameters of the point cloud data associated with the zone corresponding to the node;
   identify a location parameter of a first-level node based on one or more of GPS or IMU data associated with the point cloud data associated with the zone corresponding to the node; and
   align the point cloud data of the first-level node with a map, the alignment based on one or more of the identified pose parameters and the location parameters.

3. The system of claim 2, wherein the memory further stores instructions that, when executed by the one or more processors, cause the system to:
   compute an accuracy score for the alignment of the point cloud data of the first-level node with the map; and
   lock one or more of a location parameter and pose parameter of the first-level node when the accuracy score for the alignment of the two or more first-level nodes meets a predefined high-quality threshold.

4. The system of claim 1, wherein: the connection between the point cloud data for the zones corresponding to the two or more first-level nodes comprises matching features in an area of overlap between the zones.

5. The system of claim 1, wherein the memory further stores instructions that, when executed by the one or more processors, cause the system to:
   adjust one or more of a pose or a location of a second-level node based on the connections between the subset of first-level nodes that comprise the second-level node.

6. The system of claim 1, wherein the memory further stores instructions that, when executed by the one or more processors, cause the system to:
   adjust one or more of a pose or a location of each first-level node in two subsets of first-level nodes based on a connection between the two second-level nodes corresponding to the two subsets of first-level nodes.

7. The system of claim 2, wherein the memory further stores instructions that, when executed by the one or more processors, cause the system to:
   determine if newly obtained point cloud data denotes a change in the structures within a zone as represented by earlier obtained point cloud data; and
   updating the map with the newly obtained point cloud data if the newly obtained point cloud data denotes a change that exceeds a predefined threshold for measuring change.

8. The system of claim 1, wherein: the source is a LiDAR scanning system.

9. A method, comprising:
   obtaining point cloud data from one or more sources corresponding to one or more zones within a real-world space, the point cloud data representing surface features of structures detected within the one or more zones;

defining a plurality of first-level nodes based on the point cloud data, individual first-level nodes corresponding to obtained point cloud data corresponding to individual zones of the one or more zones;

identifying connections between two or more first-level nodes, the connections between the two or more first-level nodes based on connections between the point cloud data for the zones corresponding to the two or more first-level nodes; and defining a plurality of second-level nodes, individual second-level nodes corresponding to aggregated subsets of first-level nodes for which connections are identified, wherein the method further comprising:

identifying one or more pose parameters of a first-level node based on the pose parameters of the point cloud data associated with the zone corresponding to the node;

identifying a location parameter of a first-level node based on one or more of GPS or IMU data associated with the point cloud data associated with the zone corresponding to the node;

aligning the point cloud data of the first-level node with a map, the alignment based on one or more of the identified pose parameters and the location parameters;

computing an accuracy score for the alignment of the point cloud data of the first-level node with a map; and locking one or more of a location parameter and pose parameter of the first-level node if the accuracy score for the alignment of the first-level node meets a predefined high-quality threshold.

10. The method of claim 9, further comprising:

identifying two or more first-level nodes corresponding to zones that are at least partially overlapping; and aligning the two or more first-level nodes together in accordance with a constraint.

11. The method of claim 10, further comprising:

computing an accuracy score for the alignment between the two or more first-level nodes, the accuracy score computed based on a predetermined criteria for measuring a quality of a fit between point clouds; and locking one or more of a location parameter and pose parameter of a first-level node of the two or more first-level nodes when the accuracy score for the alignment of the two or more first-level nodes meets a predefined high-quality threshold.

12. The method of claim 9, wherein: the connection between the point cloud data for the zones corresponding to the two or more first-level nodes comprises matching features in an area of overlap between the zones.

13. The method of claim 9, further comprising:

adjusting one or more of a pose or a location of a second-level node based on the connections between the subset of first-level nodes that comprise the second-level node.

14. The method of claim 9, further comprising:

adjusting one or more of a pose or a location of each first-level node in two subsets of first-level nodes based on a connection between the two second-level nodes corresponding to the two subsets of first-level nodes.

15. The method of claim 9, further comprising:

determining if newly obtained point cloud data denotes a change in the structures within a zone as represented by earlier obtained point cloud data;

updating the map with the newly obtained point cloud data when the newly obtained point cloud data denotes a change that exceeds a predefined threshold for measuring change.

16. The method of claim 9, wherein: the source is a LiDAR scanning system.

* * * * *